United States Patent [19]

Wilder et al.

[11] Patent Number: 5,030,680
[45] Date of Patent: Jul. 9, 1991

[54] RAPIDLY CRYSTALLIZING POLYETHYLENE TEREPHTHALATE BLENDS

[75] Inventors: Charles R. Wilder; Howard F. Efner, both of Bartlesville, Okla.

[73] Assignee: Phillips Petroleum Company, Bartlesville, Okla.

[21] Appl. No.: 598,292

[22] Filed: Oct. 16, 1990

Related U.S. Application Data

[63] Continuation-in-part of Ser. No. 325,257, Mar. 17, 1989, and a continuation of Ser. No. 327,888, Mar. 23, 1989, which is a continuation-in-part of Ser. No. 177,731, Apr. 5, 1988, abandoned, said Ser. No. 325,257, is a continuation-in-part of Ser. No. 178,039, Apr. 5, 1988, abandoned.

[51] Int. Cl.$^5$ ............................ C08K 7/20; C08K 7/14; C08K 3/34
[52] U.S. Cl. .................................. 524/449; 524/456; 524/513
[58] Field of Search .................. 524/513, 456, 449

[56] References Cited

U.S. PATENT DOCUMENTS

| | | |
|---|---|---|
| 3,405,198 | 9/1968 | Rein . |
| 3,560,605 | 2/1971 | Siggel et al. .................. 264/326 |
| 3,579,609 | 5/1971 | Sevenich . |
| 3,585,255 | 5/1971 | Sevenich . |
| 3,595,818 | 8/1971 | Weissermel et al. . |
| 3,639,527 | 2/1972 | Brinkman et al. ............ 525/64 |
| 3,769,260 | 11/1973 | Segal . |
| 3,892,667 | 6/1975 | Touval .......................... 252/8.1 |
| 3,897,389 | 6/1975 | Touval . |
| 3,960,807 | 6/1976 | McTaggart . |
| 3,975,354 | 7/1976 | Buxbaum et al. . |
| 4,097,446 | 6/1978 | Abolius et al. . |
| 4,107,231 | 8/1978 | Wurmb et al. . |
| 4,122,061 | 12/1978 | Holub . |
| 4,151,223 | 5/1979 | Newberg et al. ............... 526/293 |
| 4,172,859 | 11/1979 | Epstein ........................... 525/109 |
| 4,215,032 | 8/1980 | Kobayashi et al. ............. 525/437 |
| 4,223,113 | 9/1980 | Bier et al. ...................... 525/439 |
| 4,338,243 | 6/1982 | Hecht et al. ................... 524/287 |
| 4,344,874 | 8/1982 | Akagi et al. ................... 524/513 |
| 4,349,503 | 9/1982 | Aharoni ......................... 264/328.16 |
| 4,368,295 | 1/1983 | Newton et al. ................. 525/166 |
| 4,385,144 | 6/1983 | Jones et al. .................... 524/114 |
| 4,412,040 | 12/1983 | Albee, Jr. et al. .............. 525/143 |
| 4,463,121 | 8/1984 | Gartland et al. ................ 524/291 |
| 4,476,274 | 10/1984 | Liu ................................ 524/445 |
| 4,486,561 | 12/1984 | Chung et al. .................. 524/107 |
| 4,533,679 | 8/1985 | Rawlings ....................... 523/204 |
| 4,539,352 | 8/1985 | Chung et al. .................. 524/109 |
| 4,572,852 | 2/1986 | Gartland et al. ................ 428/35 |
| 4,681,815 | 7/1987 | Rutkiewic et al. ............. 524/513 |
| 4,803,237 | 2/1989 | Light ............................. 524/513 |

Primary Examiner—Lewis T. Jacobs
Attorney, Agent, or Firm—Archie L. Robbins

[57] ABSTRACT

There are provided compositions comprising polyethylene terephthalate and aliphatic polyester with varying combinations of fillers. Molded samples made with these compositions variously have low warpage, good colorability, or economic advantages while retaining other good physical and mechanical properties. One group of compositions exhibits good spiral glow properties and is thus suitable for encapsulation of electronic circuitry.

26 Claims, No Drawings

RAPIDLY CRYSTALLIZING POLYETHYLENE TEREPHTHALATE BLENDS

This application is a continuation-in-part of two applications: Ser. No. 07/325,257, filed Mar. 17, 1989 pending, now co-pending, which is a continuation-in-part of application Ser. No. 07/178,039, filed Apr. 5, 1988 abandoned; and Ser. No. 07/327,888, filed Mar. 23, 1989 pending, now co-pending, which is a continuation-in-part of application Ser. No. 07/177,731, filed Apr. 5, 1988 abandoned.

BACKGROUND

This invention lies in the field of rapidly crystallizing polyethylene terephthalate molding resin blends.

Various crystallizing and nucleating agents (including esters) are known for promoting the crystallization rate of polyethylene terephthalate from a melt phase. Such a rate increase in crystallization is desirable for purposes of shortening molding cycle times and lowering molding temperatures.

Bier, et al., in U.S. Pat. No. 4,223,113 teach combinations of polyalkylene terephthalate and "an oligomeric polyester having a minimum polymerization degree of 2 and a maximum number-average molecular weight of about 6,000, said oligomer being free of any substitutes which are substantially reactive with said high molecular weight polyalkylene terephthalate under injection molding conditions" (see, for example, claim 1 of Bier, et al., '113). The oligomers can be formed by the reaction of sebacic or adipic acid with diols and monohydric alcohols.

Hecht, et al., in U.S. Pat. No. 4,338,243 and Deyrup, U.S. Re. No. 32,334 teach the use of esters of aromatic carboxylic acid and alcohols as polyethylene terephthalate crystallization promoters.

However, so far as now known, no one has previously taught or suggested the use of medium number-average molecular weight aliphatic polyesters as reactive crystallization promoters for polyethylene terephthalate.

There is a need for polyethylene terephthalate molding resin blends which can be reinforced with fillers but which still have good processability in injection molding applications and other applications requiring good spiral flow properties. An intricately shaped mold is difficult to fill. Electronic applications require blends with physical properties that allow electrical parts to remain undamaged during injection molding processes.

SUMMARY OF THE INVENTION

An object of this invention is to provide glass fiber reinforced polyethylene terephthalate compositions.

Another object is to provide such compositions which have improved processability for injection molding; in a more specific embodiment it is an object to provide a composition for encapsulating electronic circuit parts by injection molding.

Another object of the present invention is to provide polyethylene terephthalate resin compositions which are rapidly crystallizable.

Another object is to provide such compositions which have a broad crystallization temperature range and high heat distortion temperatures.

Another object is to provide such compositions which can be compounded with other materials to produce molding resin blends which have improved properties, such as, for example, blends with acceptable engineering resin performance characteristics.

Another object is to provide such a composition which can be flame retarded through the addition thereto of further additives which when so added do not cause a significance reduction in desired properties.

Another object is to provide processes for making and using such compositions.

Another object is to provide articles made from such compositions.

Other and further objects, aims, purposes, feature, advantages, embodiments, and the like will become apparent to those skilled in the art from the teachings of the present specification taken with the appended claims.

The present invention is directed to a new and very useful class of polyethylene terephthalate resin composition which contain: filler; from about 0.1 to about 25 percent by weight of an aliphatic polyester having a number-average molecular weight in the range from about 7,500 to about 20,000 and which comprises a condensation reaction product of an alkanediotic acid containing from about 8 to about 12 carbon atoms per molecule and an alkanediol containing from 2 to about 5 carbon atoms per molecule; a metal salt of an ionic hydrocarbon copolymer of an alpha-olefin containing from 2 to about 5 carbon atoms per molecule and an alpha,beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium.

Such compositions crystallize rapidly, have a broad crystallization temperature range, broad heat distortion temperature range, and display high heat distortion temperatures. The physical properties of such compositions are generally acceptable; that is, such properties are usually almost unchanged or are improved compared to the corresponding properties of polyethylene terephthalate compositions which do not contain such aliphatic polyester. These compositions have improved processability.

In addition, the molding resin compositions of this invention retain to an unexpected and remarkable extend such an acceptable combination of performance characteristics when a selected class of flame retardants is admixed therewith even up to a level of about 20 weight percent, or even somewhat higher, if desired. This achievement with such flame retardants is particularly unexpected because various other flame retardants cannot even be mixed with a molding resin composition of this invention under extrusion mixing conditions without causing a significant and unacceptable deterioration of the polyethylene terephthalate matrix resin.

Incorporating fillers into the compositions of this invention is useful for producing compositions with improved properties. For example, use of various fillers can variously result in reduced warpage, reduced density, changes in electrical properties, improved dimensional stability, or increased cost effectiveness.

When compounded with suitable other material, the resin compositions of this invention can be used to produce molding resin blends which have acceptable engineering resin performance characteristics. For example, blends with polymeric epoxy compounds exhibit increases in impact strength.

The present invention is further directed to methods for making and using such resin compositions.

Optionally, to increase impact strength, such a blend of this invention can additionally contain from greater than 0 to about 5 weight percent of a polymeric epoxy compound of the type comprised of a condensation product of bisphenol A with epichlorohydrin. The average number of repeating units of bisphenol A/epichlorohydrin per molecule in such a condensate can range from about 0.1 to about 20.

To flame retard a composition of this invention, one can admix therewith from greater than 0 to about 50 pph resin, more preferably from about 25 to about 35 pph resin of a composition consisting essentially of:

(i) brominated polystyrene having a number average molecular weight ranging from about 10,000 to about 400,000, and having a bromine content in the range from about 55 to about 75 weight percent (based on total weight of the brominated polystyrene), and (ii) antimonate of at least one metal selected from Group I, Group II, and Group VII of the Periodic Table; wherein the weight ratio of said brominated polystyrene to said antimonate ranges from about 2:1 to about 12:1, and more preferably, from about 3:1 to about 10:1.

To color a composition of this invention, one can admix therewith from greater than 0 to about 10 weight percent, more preferably from about 0.05 weight percent to about 8 weight percent, based on total weight of the composition, of a colorant. The amount of colorant which is preferable will vary widely, depending on the widely varying concentrations in the colorants available.

DETAILED DESCRIPTION

The Polyethylene Terephthalate

The polyethylene terephthalate employed herein has an inherent viscosity of at least about 0.25 and preferably at least about 0.4 as measured by ASTM D-2857. The polyethylene terephthalate preferably has an upper limit on inherent viscosity of about 1.2. Inherent viscosity is measure in a 3:1 volume ratio of methylene chloride and trifluoroacetic acid at 30° C. The term polyethylene terephthalate is meant to include up to 50 percent by weight of other comonomers or modifying agents. Such comonomers or modifying agents include various diols such as 1,4-butanediol, cyclohexane dimethanol, diethylene glycol, polyalkylene oxide, neopentyl glycol, butylene glycol, and 1,3-propanediol or mixtures of two or more diols. Likewise, such comonomers or modifying agents can include p-hydroxy benzoic acid and various diacids such as isophthalic acid, adipic acid, sebacic acid, and 2,6-naphthalene dicarboxylic acid. Mixtures of two or more diacids can be used. Suitable polyethylene terephthalate polymers are commercially available.

The Aliphatic Polyester

The aliphatic polyesters have a number-average molecular weight in the range of from about 7,500 to about 20,000, preferably about 8,000 to about 10,000 and comprise condensation products of alkanedioic acids containing from about 8 to about 12 carbon atoms per molecule and alkanediols containing from 2 to about 5 carbon atoms per molecule. Preferred alkanedioic acid comonomers for such polyesters contain about 8 to about 10 carbon atoms per molecule and preferred alkanediol comonomers for such polyesters contain about 3 to about 4 carbon atoms per molecule. One presently most preferred such polyester is a condensation product of sebacic acid with 1,2-propanediol. Characteristically, the polyester is in the physical form of a liquid at ambient conditions.

The Ionic Hydrocarbon Copolymer

The ionic hydrocarbon copolymer contemplated as useful is a metal salt of an ionic hydrocarbon copolymer of an alpha-olefin containing from 2 to about 5 carbon atoms per molecule and an alpha,beta-ethylenically unsaturated carboxylic acid containing from 3 to about 5 carbon atoms per molecule in which copolymer the neutralized anionic carboxyl groups are associated with cations of the metal with the copolymer having a number average molecular weight in excess of about 3,000 prior to neutralization, and with the metal being selected from the group consisting of sodium and potassium.

Representative ionic hydrocarbon copolymers comprise the sodium and/or potassium salts of copolymers of olefins (especially ethylene) with acrylic acid, methacrylic acid, or mixtures thereof which are at least about 30 percent neutralized. Suitable copolymers are commercially available.

The aliphatic polyester and the ionic hydrocarbon copolymer (also known as ethylene acid copolymer or ionomer) in combination with polyethylene terephthalate induce rapid crystallization of the polyethylene terephthalate so that melt injection of the composition into a mold having a surface temperature of about 110° C. results in molded products with good properties. Typical cycle times at such a mold temperature are characteristically not more than about 30 seconds.

The Antioxidant

Many different antioxidants can be used. In general, preferred antioxidants are thermally stable at the processing temperature employed. Hindered phenol antioxidants are presently preferred. The antioxidant which is presently most preferred is available from Ciba-Geigy Corporation as "Irganox 1010", the active component of which is believed to be tetrakis (methylene 3-[3,5-di-t-butyl-4-hydroxyphenyl] propionate) methane. Other suitable antioxidants include:

(A) Borg Warner's "Ultranox 626", the active agent of which is bis[2,4-di-t-buryl phenyl pentaerythritol] diphosphite;

(B) Ciba-Geigy's "Irganox 259", the active agent of which is 1,6-hexamethylene bis(3,5-di-t-butyl-4-hydroxy-hydrocinnamate) and/or 1,6-hexamethylene bis(3-[3,5-di-t-butyl-4-hydroxyphenyl]-propionate);

(C) Ferro Corporation's "Oxi-Chek 116", the active agent of which is octadecyl 3,5-di-t-butyl-4-hydroxyhydrocinnamate; and (D) Ciba-Geigy's "Irganox 1098", the active agent of which is N,N'-hexamethylene bis[3,5-di-t-butyl-4-hydroxy-hydrocinnamide].

Fillers

The fillers primarily contemplated as part of the composition of this invention are glass fibers used either alone or in combination with Wollastonite, mica or glass spheres; or Wollastonite, mica or glass spheres alone. Other conventional fillers known in the art can also be used. Examples of non-fibrous, inorganic fillers include clay, talc, kaolin, calcium carbonate, barytes, ceramic spheres, glass flakes, calcium silicate, and the like. Mixtures of two or more non-fibrous inorganic fillers can be used.

Examples of non-fibrous organic fillers include wood and shell flours, starches, carbohydrate by-products, synthetic organics, such as polyvinylidene dichloride spheres, and the like. Mixtures of two or more non-fibrous organic fillers can be used.

Examples of metal powders, flakes, or fibers include aluminum, bronze, zinc, nickel, stainless steel, and the like. Mixtures of two or more metals can be used. Oxides of metals such as titanium dioxide, zinc oxide, and the like are also contemplated as useful. Mixtures of two or more metal oxides can be used. Also, mixtures of metals and metal oxides can be used.

Examples of other fibrous fillers include those comprised of aramid, carbon, hybrids (such as aramid/carbon, aramid/carbon/glass, aramid/glass, carbon/glass, and the like), boron, ceramic, metal, Wollastonite, mixtures thereof and the like.

Mixtures of organic and inorganic fillers can be used. Also useful are mixtures of fibrous and non-fibrous fillers, including such combinations as glass fibers and glass flakes, glass fibers and mica, glass fibers and Wollastonite, glass fibers and glass spheres, and the like. Metal fillers, metal oxide fillers and mixtures of these can be combined with other fibrous or non-fibrous fillers or with other organic or inorganic fillers or with various mixtures of fillers from these categories.

the glass fibers presently preferred have an average cross-sectional thickness in the range from about 7 to 15 microns, preferably from about 8 to about 10 microns and an average length in the range from about 2 to about 8 millimeters, preferably from about 2.5 to about 5 millimeters. Such glass fibers are commercially available. The glass fibers and Wollastonite, mica or glass spheres when present, are used in an amount within the range of 4 to 20 weight percent based on the total weight of the composition in the embodiments of this invention directed to electronic circuitry encapsulation and other applications requiring low viscosity injection molding compositions. Embodiments of this invention for other applications have up to about 65 weight percent, based on total weight of the composition, of filler.

When mixtures of more than one filler are used, the proportionate amounts of the fillers will vary according to the form and properties of the fillers and according to the properties desired in the articles to be made from the polyethylene terephthalate molding composition. For example, in a composition comprising:
 (a) from about 30 to about 90 weight percent, based on total weight of the composition, of polyethylene terephthalate;
 (b) from about 5 to about 65 weight percent, based on total weight of the composition, of filler;
 (c) from about 0.5 to about 15 pph resin of an aliphatic polyester;
 (d) from about 0.1 to about 7 pph resin of a metal salt of an ionic hydrocarbon copolymer;
 (e) from about 0.01 to about 2 pph resin of an antioxidant;
the filler can comprise a mixture of mica and fiber glass having a ratio of mica to fiber glass from about 10:1 to about 1:10.

The Polymeric Epoxy Compound

Such polymers are commercially available. Representatives include the trademarked products "Epon 828", "Epon 1001F," and "Epon 1009 F" available from Shell Chemical Company.

The Polyethylene

Preferably the polyethylene has a molecular weight ranging from about 600 to 3,000. Such polymers are commercially available. Representatives include the trademarked materials "Epolene N34" or Epolene C-10" from Eastman Chemical Company and "Polywax 500", "Polywax 655", and "Polywax 1000" from Petrolite Specialties Polymers Group.

The Flame Retardant

In the present application, the presently preferred flame retardant comprises brominated polystyrene with an antimonate synergist.

The Brominated Polystyrene

Preferably, the bromine content of the brominated polystyrene is at least about 60 weight percent of such polymer. Preferably, such polymer has a number average molecular weight ranging from about 10,000 to about 400,000, preferably about 225,000 to about 350,000. Such brominated polystyrenes are available commercially.

For purposes of achieving flame retardancy, the combined weight of the brominated polystyrene and the antimonate (see below) in a resin blend is preferably at least about 4 weight percent of the total resin blend. A presently preferred weight ratio of brominated polystyrene to antimonate compound(s) is from about 3:1 to about 10:1.

The Antimonate

A presently particularly preferred antimonate is sodium antimonate although zinc antimonate and nickel antimonate and mixtures thereof are also preferred. The antimonate is usually employed in a finely-divided particulate or powder form.

Other Additives

In addition to the components discussed herein, the composition of this invention may contain other additives commonly employed (and in the quantities known to the art or sufficient to achieve the desired result) with polyethylene terephthalate. Examples include colorants such as carbon black or blue concentrate, mold release agents such as low molecular weight polyethylene wax, tougheners, heat and ultraviolet light stabilizers (including phenols and phenol derivatives), and the like. Usually, the total quantity of such other additives is not more than about 20 weight percent of the total weight of the composition, although higher amounts could be used if desired.

Preparation

The blend compositions are prepared by blending together the components by an convenient means. For example, dry polyethylene terephthalate can be dry mixed in any suitable blender or tumbling means with the other components and the resulting mixture melt extruded. For example, an aliphatic polyester, such as is available from C. P. Hall as "Easy Mix Paraplex G-25", is obtained conveniently preliminarily premixed with a finely divided calcium silicate and then the resulting mixture is admixed with the polyethylene terephthalate before melt extrusion. In general, if a filler is used, the polyethylene terephthalate is conveniently preblended therewith and then the resulting mixture is mixed with the other ingredients such as the minor additives and optional ingredients such as flame retardants, polyethylene wax, epoxy resin, colorants, etc., before melt-extrusion. A convenient melt extrusion temperature ranges from about 540° to about 580° F. (282° to 304° C.). The extrudate is in a strand form which preferably can be chopped into pellets or the like as desired.

Composition

The compositions of this invention are summarized by the following Table 1:

TABLE 1

Polyethylene Terephthalate Compositions

| Component | Quantity (100 wt. % basis) Broad Range Wt. % | Preferred Range Wt. % |
|---|---|---|
| 1. Polyethylene Terephthalate | 30–95.7 | 35–95 |
| 2. Aliphatic Polyester | 0.1–25 | 0.5–15 |
| 3. Filler | 4–65 | 4–20[a] |
| 4. Ionic Hydrocarbon Copolymer | 0.1–7 | 0.1–3 |
| 5. Antioxidant | 0.1–1 | 0.4–0.6 |
| 6. Polyethylene[c] | 0–3 | 0.6–3 |
| 7. Epoxy Compound[c] | 0–3 | 0.5–0.95 |
| 8. Flame Retardant[b,c] | 0–20 | 12.5–15.9 |
| 9. Colorants[c] | 0–10 | 12.5–15.9 |

[a]This is the preferred range for injection molding electronic circuitry and other applications where low filler loading is advantageous. For other injection molding applications, 25 to 60 weight percent is the preferred range.
[b]Flame retardant package consisting essentially of brominated polystyrene and metal antimonate in the weight ratios stated above.
[c]Optional ingredient.

Usage and Characteristics

The polyethylene terephthalate molding resin blend compositions of this invention are conventionally injection moldable; for example, using injection molding temperatures ranging from about 518° to about 583° F. (270° to 305° C.) When water cooled molds are used, the mold surface temperature ranges from about 85° to about 110° C. (185° to 235° F).

The compositional characteristics of inventive compositions containing polyethylene terephthalate, aliphatic polyester and glass fibers are illustrated, for example, in Table 2 below. Table 3 presents illustrative properties of molder specimens for (1) polyethylene terephthalate alone, (2) polyethylene terephthalate in combination with aliphatic polyester, (3) polyethylene terephthalate in combination with glass fibers, (4) polyethylene terephthalate in combination with glass fibers and with aliphatic polyester. Table 3 demonstrates (a) the rapid crystallization, (b) the broad crystallizing temperature range, and (c) the high heat distortion temperatures which are associated with compositions of this invention.

The glass fiber concentrations shown in Table 2 are all outside the ranges for the encapsulation grade composition of this invention, but this table demonstrates that on both sides of the range of glass fiber content for encapsulation grade composition good crystallization occurs. Thus, of course good crystallization occurs with compositions having from 4 to 20 weight percent based on total weight of the composition of glass fibers also.

Available evidence suggests that a filler such as glass fibers generally acts as a mild nucleating agent for promoting crystallization in a polyethylene terephthalate resin matrix since it increases resin Tmc (the temperature at which a molten polymer starts to crystallize when cooled from the melt) and decreases resin Tcc (the temperature at which an amorphous polymer starts to crystallize when heated) in polyethylene terephthalate, and since it does not appear to alter either resin Tm (the melt temperature of a polymer at ambient pressure) or resin Tg (the glass transition temperature of a polymer).

The polyethylene terephthalate/aliphatic polyester combinations of this invention display (compared to untreated, or fiber glass filled, polyethylene terephthalate):

(1) A reduced or substantially shortened crystallization time, which may conveniently be defined, for example, as the time needed at some present temperature which is substantially below Tcc to go from Tm to Tcc (such preset temperature can be chosen to be the upper surface temperature limit of a water cooled mold or about 110° C.);

(2) An increased crystallizing temperature range, which may conveniently be defined, for example, as the difference between Tmc and Tcc;

(3) A generally unchanged or improved combination of physical strength characteristics; and (4) A substantially higher heat distortion temperature.

This combination of effects is believed not to have been observed previously for a crystallization agent of the aliphatic polyester type in polyethylene terephthalate. The increased or elevated heat distortion temperature is theorized to be associated with a reaction occurring under extrusion conditions, and also under molding conditions, between the polyethylene terephthalate and the aliphatic polyester which increases the polyethylene terephthalate effective molecular weight. This result is contrary to the teachings of, for example, Bier, et al., in the afore-referenced U.S. patent where it is stated that the reaction between polyethylene terephthalate and ester induces chain scission or an undesired deterioration in properties of polyethylene terephthalate. This result is also contrary to the teaching of Hecht, et al., and Deyrup in the afore-referenced U.S. patents where aromatic esters are used to effect a type of steric hindrance which minimizes or obviates any chain scission reaction between ester additive and polyester terephthalate.

TABLE 2

| | Examples (100 wt. percent total basis) | | | |
|---|---|---|---|---|
| Component | 1 | 2 | 3 | 4 |
| (1) Polyethylene Terephthalate[1] | 100 | 98 | 55 | 51.4 |
| (2) Aliphatic Polyester[3] | 0 | 2 | 0 | 3.6 |
| (3) Glass Fibers[2] | 0 | 0 | 45 | 45 |

[1]The polyethylene terephthalate has an intrinsic viscosity of about 0.65.
[2]The glass fibers were obtained from the manufacturer Owens-Corning Company under the trade designation 492-AA. These fibers are believed to have average diameters of about 9 microns and average lengths of about 3 millimeters. The fibers are initially in the form of clumps.
[3]The polyester was obtained from C. P. Hall Company under the trademark "Paraplex G-25" and is believed to be a condensation product of sebacic acid and 1,2-propanediol. The polyester has a number-average molecular weight of about 8,000.

TABLE 3

| Properties | Examples 1[1] | 2 | 3 | 4 |
|---|---|---|---|---|
| 1. Flow rate after molding | — | — | 119 | 83 |
| 2. Strength | | | | |
| 2.1 Flexural modulus | 0.350–.45 | — | 2.1 | 2.2 |
| 2.2 Flexural strength | 14–18 | — | 34.9 | 38.4 |
| 2.3 Tensile strength at break | 7–10.5 | — | 19.9 | 20.7 |
| 2.4 Elongation[2] | 30–300 | — | 3.2 | 3.7 |
| 2.5 Izod (notched) | 0.25–0.7 | — | 2.7 | 2.3 |
| 2.6 Izod (unnotched) | — | — | 18.0 | 21.8 |
| 3. Thermal characteristics | | | | |
| 3.1 Heat distortion | 70–100 | 170–205 | 96 | 214 |
| 3.2 DSC | | | | |
| 3.2.1 Tg | 83 | 77 | 79 | 69 |
| 3.2.2 Tcc | 164 | 131 | 137 | 118 |
| 3.2.3 Tm | 254 | 250 | 254 | 250 |
| 3.2.4 Tmc | 188 | 193 | 193 | 187 |
| 3.2.5 Cw | 14 | 36 | 32 | 38 |
| 3.2.6 Tmc-Tcc | 24 | 62 | 56 | 69 |
| 4. Crystallization time | no crystallization | less than about 30 seconds[4] | 30–60 seconds[3] | less than about 30 seconds[4] |

[1] The values for polyethylene terephthalate (Example 1) as regards flexural modulus flexural strength at break, elongation and Izod (notched) are taken from "The Plastics Encyclopedia (1988)" pp. 532-533.
[2] The decrease in elongation with polyethylene terephthalate blends containing aliphatic polyester and/or glass fibers is considered to be typical of a change from an amorphous molded state to a crystalline molded state.
[3] Based on hold time, but crystallization is incomplete (less than 60%).
[4] Crystallization may be only about 60% complete.

Comments on Table 3

Item 1. Flow rate (before and after molding) is measured in an extrusion plastormeter by ASTM procedure D 1238 at 275° C. using a 2.16 kilogram load as grams per 10 minutes.

Items 2.1 and 2.2. Flexural modulus and flexural strength are each measured in accordance with the procedure defined in ASTM D790 in million psi and in thousand psi, respectively.

Items 2.3 and 2.4. Tensile strength at break and elongation at break are each measured in accordance with the procedure defined in ASTM D638 in thousand psi and in percent, respectively.

Items 2.5 and 2.6. Izod impact strength, both notched and unnotched, is measured in accordance with the procedure defined in ASTM D256 in ft.lb./in.

Item 3.1. Heat distortion is measured in accordance with the procedure described in ASTM D648 in degrees C at a load of 1820 kiloPascals.

Item 3.2. "DSC" references thermal data determined by a Differential Scanning Calorimeter.

Item 3.2.1. "Tg" references glass transition temperature, degrees C.

Item 3.2.2. "Tcc" references the temperature at which an amorphous polymer starts to crystallize when heated, degrees C.

Item 3.2.3. "Tm" references the melt temperature at ambient pressure, degrees C.

Item 3.2.4. "Tmc" references the temperature at which a molten polymer starts to crystallize, degrees C.

Item 3.2.5. "Cw" references the so-called crystallization window as defined by the equation: $(Tmc-Tcc)/(Tm-Tg)$ multiplied by 100 where Tmc, Tcc, Tm, and Tg have their above defined meanings.

Item 3.2.6. Tmc—Tcc defines the crystallization temperature range. An alternative is to use Cw as a value showing crystallizing temperature range.

Item 4. Crystallization time is measured in seconds.

Table 4 presents properties for compositions of the invention and molded bodies made therefrom which have glass fiber contents ranging from about 30 to about 45 weight percent based on total weight of the composition; polyethylene terephthalate contents ranging from about 38 to about 64 weight percent based on total weight of the compositions and polyester contents ranging from about 2.7 to about 4.6 weight percent based on total weight of the composition. Table 4 demonstrates the rapid crystallization and high after-molding flow rates characteristic of these blends containing polyester, both with and without flame retardant.

Again, it is noted that the glass fiber content is outside the range needed for electronic encapsulation grade compositions of this invention, but this table demonstrates the good properties of the filled polyester/aliphatic polyester compost ion broadly.

TABLE 4

| Properties | art recognized engineering resin minimal values | non-flame retarded w/out epoxy compound | flame retarded without epoxy compound |
|---|---|---|---|
| 1. Flow rate after molding | 3–10 | 23–27 | 31–58 |
| 2. Strength | | | |
| 2.1 flexural modulus | at least 1.4 | 1.5–2.1 | 1.4–2.3 |
| 2.2 flexural strength | at least 27 | 34.0–39.0 | 27.9–29.7 |
| 2.3 tensile strength | at least 18 | 20.2–20.9 | 18.0–19.7 |

TABLE 4-continued

| Properties | art recognized engineering resin minimal values | non-flame retarded w/out epoxy compound | flame retarded without epoxy compound |
| --- | --- | --- | --- |
| (at break) | | | |
| 2.4 elongation | at least 2 | 4.1–4.9 | 3.0–3.9 |
| 2.5 Izod (notched) | at least 1.4 | 2.1–2.2 | 1.4–1.9 |
| 2.6 Izod (unnotched) | at least 8 | 15.9–20.0 | 8.2–9.8 |
| 3. Thermal Characteristics | | | |
| 3.1 heat distortion | at least 210 | 221–227 | 212–222 |
| 3.2 DSC | | | |
| 3.2.1 Tg | not more than 75 | 73–75 | 71–72 |
| 3.2.2 Tcc | not more than 117 | 119–120 | 117–118 |
| 3.2.3 Tm | at least 250 | 252–254 | 253–254 |
| 3.2.4 Tmc | at least 200 | 205–209 | 204–206 |
| 3.2.5 Cw | at least 47 | 48 | 47–49 |
| 4. Surface Appearance | smooth & glossy | smooth & glossy | smooth & glossy |
| 5. Crystallization Time | about 30–90 | less than 30 | less than 30 |

Comments on Table 4

Item 1: Flow rate (before and after molding) is measured in an extrusion plastometer by ASTM procedure D1238 at 275° C. using a 2.16 kilogram load as grams per 10 minutes.

Items 2.1 and 2.2: Flexural modulus and flexural strength are each measured in accordance with the procedure defined in ASTM D790 in million psi and in thousand psi, respectively.

Items 2.3 and 2.4: Tensile strength at break and elongation at break are each measured in accordance with the procedure defined in ASTM D638 in thousand psi and in percent, respectively.

Items 2.5 and 2.6: Izon impact strength both notched and unnotched is measured in accordance with the procedure defined in ASTM D256 in ft.lb./in.

Item 3.1: Heat distortion is measured in accordance with the procedure described in ASTM D648 in degrees C. at a load of 1820 kiloPascals.

Item 3.2: "DSC" references thermal data determined by a Differential Scanning Calorimeter.

Item 3.2.1: "Tg" references glass transition temperature, degrees C.

Item 3.2.2: "Tcc" references the temperature at which an amorphous polymer starts to crystallize when heated, degrees C.

Item 3.2.3: "Tm" references the melt temperature at ambient pressure, degrees C.

Item 3.2.4: "Tmc" references the temperature at which a molten polymer starts to crystallize, degrees C.

Item 3.2.5: "Cw" references the crstallization window as defined by the equation: (Tmc−Tcc)/(Tm−Tg) multiplied by 100 where Tmc, Tcc, Tm, and Tg have their above defined meanings.

Item 5: Crystallization time is measured in seconds.

EXAMPLES

The following examples are presented in further illustration of the invention and are not to be considered as unduly limiting the scope of this invention.

EXAMPLES 1–4

The following examples illustrate molding resin blends of this invention in comparison with the prior art. Unless otherwise noted, the data presented are based on actual tests.

Examples 1 and 3 shown in Tables 2 and 3 above involve the prior art and are provided from comparison purposes. The material of Example 1 consists of polyethylene terephthalate. The composition of Example 3 consists of a mixture of polyethylene terephthalate and glass fibers.

Examples 2 and 4 shown in Tables 2 and 3 illustrate the present invention. Example 2 consists of a blend of aliphatic polyester and polyethylene terephthalate. Example 4 consists of a blended mixture of polyethylene terephthalate, aliphatic polyester, and glass fibers.

The composition of all blends is shown on Table 2.

The starting polyethylene terephthalate was preliminarily dried at about 250° F. (121° C.) for about 16 hours in a vacuum oven.

Examples 2, 3 and 4 were prepared by tumble mixing the respective components together. The composition of each example was melt extruded through a 38 mm single screw extruder at a melt temperature of about 580° F. (304° C.) and passed through a stranding die. In each instance, the strand was cooled and chopped into pellets. The pellets were dried at about 250° F. (121° C.) for about 16 hours in a vacuum oven.

The dried chopped strands were molded in a 1.5 ounce injection molding machine at about 540° F. (282° C.) with a fast ram using a delayed injection time of 0.1 second, a hold time of 4 seconds, a cool time of 25 seconds, and an open time of 3 seconds. The mold cavity surface temperature was 235° F. (113° C.). The objects molded include an ASTM standard "dog bone" and an impact bar for Izod impact testing, heat distortion testing, and flexural property testing.

The properties of the resin of each example and objects molded therefrom are summarized in Table 3 above. These properties show that the compositions of this invention display rapid crystallization rates, broad crystallizing temperature range, and very high heat distortion temperatures.

For present purposes the crystallization time is defined as the time needed to go from Tm to Tcc (as these values are defined above in the above comments to Table 3 measured using a mold surface temperature of about 110° C.). The aliphatic polyester surprisingly induces crystallization in less than about 30 seconds.

For present purposes, the crystallizing (or crystallization) temperature range is defined as the difference between Tmc and Tcc (as these values are defined above in the comments to Table 3). As can be seen from Table 3, the aliphatic polyester surprisingly induces an increase in the crystallizing temperature range.

For present purposes, heat distortion is directly measured, as shown in Table 3 (by the procedure defined in the above comments to Table 3). As can be seen from Table 3, the aliphatic polyester surprisingly induces a very substantial and unexpected increase in the heat distortion temperature.

EXAMPLE 5

Polyethylene terephthalate compositions were made using fillers such as Wollastonite and glass spheres. Wollastonite is a naturally occurring nonmetallic calcium metasilicate, $CaSiO_3$. It is the only commercially available pure-white mineral that is wholly acicular; typical length-to-diameter ratios range from 3:1 to 20:1. The theoretical composition of pure Wollastonite is 48.3 percent CaO and 51.7 percent $SiO_2$. Typical physical properties of Wollastonite include Appearance: brilliant white.
Shape: acicular.
Molecular weight: 116.
Specific gravity: 2.9.
Refractive index: 1.63.
pH (aqueous solution): 9.9.
Water solubility: 0.0095 g/100 $cm^3$.
Density: 24.2 lb/solid gal.
Bulking value: 0.0413 gal/lb.
Coefficient of expansion: $6.5 \times 10^{-6}$ mm/deg C.
Transition point (to pseudowollastonite): 1200° C.
Melting point: 1540° C.
Hardness (Mohs): 4.5.

Preferably from about 5 weight percent to about 65 weight percent, based on total weight of the composition, more preferably from about 10 weight percent to about 60 weight percent and most preferably from about 10 weight percent to about 55 weight percent, based on total weight of the composition, of Wollastonite is used in the Wollastonite filler embodiment of this invention.

This Wollastonite filled embodiment of the invention preferably contains from about 93 weight percent to about 25 weight percent, based on total weight of the composition, more preferably from about 80 weight percent to about 30 weight percent, and most preferably from about 80 weight percent to about 34 weight percent, based on total weight of the composition, of polyethylene terephthalate.

This Wollastonite filled embodiment of the invention preferably contains from about 0.1 pphr (parts per hundred parts resin) to about 25 pphr, more preferably from about 1 pphr to about 20 pphr, and most preferably from about 2 pphr to about 15 pphr, of aliphatic polyester.

This embodiment of the invention preferably contains from about 0.05 pphr to about 7 pphr, more preferably from about 0.1 pphr to about 5 pphr, and most preferably from about 0.2 pphr to about 1.5 pphr, of ionic hydrocarbon copolymer.

This Wollastonite filled embodiment of the invention preferably contains from about 0.01 pphr to about 5 pphr, more preferably from about 0.1 pphr to about 2.5 pphr, and most preferably from about 0.1 pphr to about 1.0 pphr, of antioxidant.

In other embodiments of this invention, glass spheres or mica can be substituted for the Wollastonite as filler, with the composition containing the same ranges of amounts of ingredients as given above from the Wollastonite filled embodiment.

Glass spheres contemplated as useful in this invention can be either hollow or solid and usually have a diameter of less than 200 microns. The spherical shape of glass microspheres allows them to act as tiny ball bearings, providing better flow properties than high-aspect-ratio fillers. Sphericity of these fillers also yields better stress distribution.

Another benefit of the spherical shape of glass beads is derived from their surface area. Geometrical calculations show that spherical particle has a minimum ratio of surface area to volume. This means that, for a given weight of solid glass microspheres, the total surface area is less than that obtained by an equivalent weight of any other solid additive (correcting for the effect of differences in specific gravity). The amount of viscous drag between the surface of filler particles and the resin is therefore smaller with spheres than with other shapes. Hollow spheres have the additional advantage of contributing to reduction of density when a product with less mass is desired. The glass composition normally used for solid microspheres is the soda-lime or A-glass formulation, although E-glass solid spheres are available. Solid glass microspheres are commercially available in graded sizes from 5 to 5000 microns in diameter. The size most frequently used in plastics is generally less than 325 mesh, with the average sphere 30 microns in diameter.

The composition of currently available hollow glass microspheres is similar to that of the solid spheres. The hollow spheres are produced either from A-glass, as are their solid counterparts, or from mixtures of silicates and insolubilizing agents. E-glass compositions are also available.

Depending on the manufacturing process employed, the glass microspheres contain varying combinations of gaseous carbon dioxide, nitrogen, oxygen, sulfur dioxide, and water at pressures ranging from 1 to 5 psi.

Hollow glass microspheres are generally supplied in a particle-size range from 10 to 200 microns, with average diameter ranging from 65 to 75 microns. These products are generally somewhat larger than solid glass spheres used in plastics and are not classified into narrow product-size bands.

The specific-gravity range of available hollow glass microspheres is 0.15 to 0.38. If a commonly used hollow microsphere with a specific gravity of 0.21 is compared to the denser fillers with specific gravities of approximately 2.4 to 2.6, it is apparent that a factor of about 12 exits in their relative contributions to the weight of products made with hollow spheres.

Even more advantageous than use of either Wollastonite, glass spheres or mica by itself as filler is the use of combinations of each of these with glass fibers. Preferably the ratio of glass fibers to Wollastonite (or to glass spheres or to mica, depending upon which is used) is from about 10:1 to about 1:10. More preferably, the ratio of glass fiber to other filler is from about 8:1 to about 1:8. Most preferably, the ratio of glass fiber to other filler is from about 6:1 to about 1:6.

Runs 7, 8, 9 and 10 in Table 5 show the amounts of components in polyethylene terephthalate molding compositions which individually contained both fiber glass and Wollastonite fillers. The weight ratio of fiber glass to Wollastonite in these specific compositions varied over the range of 2:1 to 1:3. The properties of injection molded samples made from these compositions are also shown in Table 5. Similar results are given in Table 5 for related systems containing single fillers such as fiber glass alone (Run 5) and Wollastonite alone (Run 6).

All the compositions of this example were blended, processed and injection molded as described hereinabove.

Runs 5 and 6 in Table 5 show that molded samples prepared from the glass fiber filled system (Run 5) exhibited mechanical and heat distortion temperature properties which were vastly superior to the properties of molded samples prepared from the Wollastonite filled composition (Run 6). In each of these systems filler constituted 15 weight percent of the total composition.

Although the Wollastonite filled system provided molded samples with somewhat deficient properties, it was found (see Runs 7, 8, 9 and 10) that systems filled with both fiber glass and Wollastonite at a total mixed filler loading of 15 to 20 weight percent provide useful polyethylene terephthalate molding compositions. For example, economic advantages are realized by replacing part of the fiber glass with the cheaper Wollastonite for use in applications in which the properties of the molded samples are acceptable.

Runs 5 and 10 in Table 5 show that one third of the fiber glass filler (in Run 14) can be replaced with Wollastonite as done in Run 10 while retaining properties of molded samples made from the two molding compositions which are adequate for some applications. For example, the heat distortion temperatures of molded samples in Runs 5 and 10 were essentially identical. Mechanical properties were slightly compromised. The further replacement of an additional one-third of the fiber glass from the Run 5 composition is demonstrated in composition 9. The properties of molded samples from Run 9 were somewhat diminished but such materials could be used in selected applications.

The compositions in Runs 8 and 10, had total mixed filler loadings, respectively, of 20 and 15 weight percent. Composition 8 was 10 weight percent fiber glass and 10 weight percent Wollastonite; composition 10 was 10 weight percent fiber glass and 5 weight percent Wollastonite.

The properties of samples molded from the composition of Run 8 (10 weight percent fiber glass and 10 weight percent Wollastonite) were very similar to the properties of samples molded from the composition of Run 10 (10 weight percent fiber glass and 5 weight percent Wollastonite). The composition of Run 8 is economical in that the additional 5 weight percent Wollastonite effectively replaced about 5 weight percent of the more expensive polyethylene terephthalate resin.

Similarly, very similar properties were demonstrated by samples molded from the composition of Run 7 (5 weight percent fiber glass and 15 weight percent Wollastonite) and samples molded from the composition of Run 9 (5 weight percent fiber glass and 10 weight percent Wollastonite). As posited above, the composition of Run 7 is economical in that about 5 weight percent of the more costly polyethylene terephthalate resin has effectively been replaced by the additional 5 weight percent of the less expensive Wollastonite.

In general, the compositions of Table 5 show that various mixes of fiber glass and Wollastonite fillers can be used to give more economical polyethylene terephthalate molding formulations while maintaining sufficiently good properties of molded samples for many applications.

TABLE 5

Wollastonite/Glass Fiber Mixed Fillers in Polyethylene Terephthalate Molding Formulations

| | Composition Run Number | | | | | |
|---|---|---|---|---|---|---|
| | 5 | 6 | 7 | 8 | 9 | 10 |
| INGREDIENTS | | | | | | |
| Polyethylene Terephthalate$^a$ | 77.7 | 77.7 | 73.7 | 73.7 | 78.3 | 78.3 |
| Glass Fiber$^b$, wt. % | 15.0 | | 5.0 | 10.0 | 5.0 | 10.0 |
| Wollastonite$^c$, wt. % | | 15.0 | 15.0 | 10.0 | 10.0 | 5.0 |
| Aliphatic polyester$^d$, pphr | 7.0 | 7.0 | 7.0 | 7.0 | 7.0 | 7.0 |
| Ionic Hydrocarbon Copolymer$^e$, pphr | 0.5 | 0.5 | 0.9 | 0.9 | 1.0 | 1.0 |
| Antioxidant$^f$, pphr | 0.5 | 0.5 | 0.5 | 0.5 | 0.5 | 0.5 |
| Color Concentrate$^g$, wt. % | 1.0 | 1.0 | | | | |
| PHYSICAL PROPERTIES | | | | | | |
| Flexural Modulus, MSI | 0.81 | 0.42 | 0.8 | 0.9 | 0.7 | 0.8 |
| Flexural Strength, KSI | 22.2 | 12.1 | 16.4 | 19.2 | 16.1 | 19.6 |
| Tensile Break, KSI | 15.7 | 3.9 | 11.2 | 13.4 | 11.3 | 13.5 |
| % Elongation | 5.1 | 16.6 | 4.7 | 4.9 | 5.0 | 5.1 |
| Notched Izod, ft.lb./in. | 1.0 | 0.5 | 0.5 | 0.6 | 0.5 | 0.6 |
| HDT, °C. at 1820 KPa | 210 | 69 | 155 | 197 | 143 | 209 |

$^a$Goodyear Traytuf ® 5900 polyethylene terephthalate was used.
$^b$CertainTeed 93B glass fibers were used.
$^c$Nyco G Wollastocup ® was used.
$^d$Paraplex ® G-25, commercially available from C. P. Hall, was used.
$^e$Formion ® 105, commercially available from A. Schulman, Inc., was used.
$^f$Irganox ® 1010, a hindered phenol antioxidant commercially available from Ciba-Geigy Corporation was used.
$^g$Reed 1333 black was used.

EXAMPLE 6

Warpage in the articles made with polyethylene terephthalate injection molding compounds can be significantly reduced by use of mica as the reinforcing material. Mica is the group name for a broad class of aluminosilicate minerals of the phyllosilicate family. They are characterized by nearly perfect basal cleavage that permits the large crystals to be split or delaminated into thin, flexible flakes. Flake reinforcements such as mica have an advantage over fibers in that they provide reinforcement in a plane instead of along a single axis.

Micas are generally characterized by excellent weather resistance, good chemical resistance, low thermal conductivity, excellent dielectric properties, and stability at high temperatures.

Most micas contain 2.5 to 4.5 percent water. Muscovite begins to dehydrate at a lower temperature than phlogopite.

The properties of micas also vary, depending upon their origins.

Grades of mica suitable for use as reinforcement material include both "dry" and "wet" ground muscovite, phlogopite and suzorite. Particle sizes range from −40 mesh (above 500 microns) to +325 mesh (below 45 microns). Flake thickness depends on the degree of delamination, from as low as 0.1 microns for highly delaminated grades. Aspect ratios range widely, from 10 to 150. Surface-modified grades, treated with coupling agents can be used in the mica-containing embodiments of this invention.

The specific type of mica used can become important when the article is to be pigmented. Lighter colored micas such as muscovite mica permit much improved coloration when colorants are added to the compound. Runs were made using suzorite mica and muscovite mica. Runs 11, 12, 13, 14, 15 and 16 in Table 6 show the amounts of components in polyethylene terephthalate molding compositions which individually contained both fiber glass and mica fillers. The weight ratio of fiber glass to mica in these specific compositions varied over the range of 2:1 to 1:3. The properties of injection molded samples made from these compositions are also given in Table 6.

All the compositions of this example were blended, processed and injection molded as described hereinabove.

Compositions 11, 12 13, 14, 15 and 16 in Table 6 show that mixed fillers such as fiber glass and mica optionally in the presence of carbon black can be used in polyethylene terephthalate molding formulations. The use of the less costly mica in the mixed filler of these polyethylene terephthalate compositions can provide economic benefits.

Runs 11 and 15 in Table 6 show that carbon black is an optional ingredient because the properties of molded samples from the non-carbon black formulation Run 15 were very similar to the properties of molded samples from the carbon black formulation of Run 11. Each of the above formulations contained a mixed filler package of 10 weight percent fiber glass and 10 weight percent mica.

Runs 12 and 14 in Table 6 show that the properties of molded samples made from these compositions were essentially the same although the composition of Run 12 contained 5 weight percent fiber glass and 10 weight percent mica while the composition of Run 14 contained 5 weight percent fiber glass and 15 weight percent mica. Thus, the additional less costly mica (5 weight percent) effectively replaced about 5 weight percent of the more expensive polyethylene terephthalate molding resin while retaining molded sample properties sufficient for satisfactory use in many applications.

Similar comments can be made in regard to Runs 13 and 15 in Table 6. The properties of sample molded from the compositions of these runs were very nearly the same although the composition of Run 13 contained 10 weight percent fiber glass and 5 weight percent mica and the composition of Run 15 contained 10 weight percent fiber glass and 10 weight percent mica. The additional 5 weight percent of the less expensive mica effectively replaced about 5 weight percent of the more expensive polyethylene terephthalate resin without significantly compromising the properties of the molded samples.

The composition used in Run 16 of Table 6 shows that the total loading of fiber glass and mica in polyethylene terephthalate molding formulations can be as high as 35 weight percent with no serious detrimental effect on molded sample properties.

TABLE 6

Polyethylene Terephthalate Molding Compositions with Mica and Glass Fiber Fillers

| | Composition Run Number | | | | | |
|---|---|---|---|---|---|---|
| | 11 | 12 | 13 | 14 | 15 | 16 |
| INGREDIENTS | | | | | | |
| Polyethylene Terephthalate[a], wt. % | 72.4 | 78.3 | 78.3 | 73.7 | 73.7 | 60.2 |
| Glass Fiber[b], wt. % | 0.0 | 5.0 | 10.0 | 5.0 | 10.0 | 15.0 |
| Mica[c], wt. % | 10.0 | 10.0 | 5.0 | 15.0 | 10.0 | 20.0 |
| Aliphatic Polyester[d], pphr | 7.0 | 7.0 | 7.0 | 7.0 | 7.0 | 7.0 |
| Ionic Hydrocarbon Copolymer[e], pphr | 1.0 | 1.0 | 1.0 | 0.9 | 0.9 | 0.5 |
| Antioxidant[f], pphr | 1.0 | 0.5 | 0.5 | 0.5 | 0.5 | 0.5 |
| Color Concentrate[g], wt. % | 1.0 | | | | | |
| PHYSICAL PROPERTIES | | | | | | |
| Flexural Modulus, MSI | 0.86 | 0.7 | 0.8 | 0.8 | 0.9 | 1.3 |
| Flexural Strength, KSI | 18.8 | 15.0 | 19.4 | 16.1 | 19.6 | 20.2 |
| Tensile Break, KSI | 12.6 | 9.8 | 12.8 | 9.7 | 12.9 | 13.4 |
| % Elongation | 4.6 | 4.1 | 4.8 | 3.7 | 4.6 | 3.7 |
| Notched Izod, ft.lb/in, | 0.6 | 0.4 | 0.7 | 0.5 | 0.7 | 0.8 |
| HDT, °C. at 1820 KPa | N.M.[h] | 144 | 197 | 140 | 194 | 174 |

[a]Goodyear Traytuf ® 5900 polyethylene terephthalate was used.
[b]CertainTeed 993 glass fibers were used.
[c]KMG 40K Mica commercially available from KMG Minerals, Inc., Kings Mountain. N.C., was used.
[d]Paraplex ® G-25, commercially available from C. P. Hall, was used.
[e]Formion ® 105, commercially available from A. Schulman, Inc., was used.
[f]Irganox ® 1010, a hindered phenol antioxidant commercially available from Ciba-Geigy Corporation was used.
[g]Reed 1333 black was used.
[h]Not measured.

In addition to the types of runs reported in Table 6, runs were made comparing molded samples made from polyethylene terephthalate compositions having different kinds of mica. For example, in the formulations shown in Table 7 below, use of the Muscovite mica resulted in a composition which could be molded into samples having a much lighter color than samples molded from the polyethylene terephthalate composition having a similar amount of Suzorite mica.

TABLE 7

Formulations for Polyethylene Terephthalate Compositions Made with Different Types of Mica

| Ingredients | Run 17 | Run 18 |
|---|---|---|
| Polyethylene Terephthalate[a], wt. % | 58.1 | 58.1 |
| Glass Fiber[b], wt. % | 15.0 | 15.0 |
| Suzorite Mica[c], wt. % | 20.0 | 0.0 |
| Muscovite Mica[d], wt. % | 0.0 | 20.0 |
| Aliphatic Polyester[e], pphr | 7.0 | 7.0 |
| Ionic Hydrocarbon Copolymer[f], pphr | 0.5 | 0.5 |
| Antioxidant[g], pphr | 0.5 | 0.5 |
| White Color Concentrate[h], wt. % | 1.5 | 1.5 |

[a]Goodyear Traytuf ® 5900 polyethylene terephthalate was used.
[b]CertainTeed 993 glass fibers were used.
[c]200NP Suzorite mica from Suzorite Mica Products, Hunt Valley, Maryland, was used.
[d]KMG 40K Mica commercially available from KMG Minerals, Inc., Kings Mountain, N.C., was used.
[e]Paraplex ® G-25, commercially available from C. P. Hall, was used.
[f]Formion ® 105, commercially available from A. Schulman, Inc. was used.
[g]Irganox ® 1010, a hindered phenol antioxidant commercially available from Ciba-Geigy Corporation was used.
[h]White color concentrate used was 28048-R1 obtained from Americhem, Inc., Cuyahoga Falls, Ohio.

EXAMPLE 7

For encapsulation of circuits in electronic parts, there is a need for polyethylene terephthalate injection molding compounds with higher flow and less viscosity to avoid damage to the circuitry during processing. Thus compositions with ranges of ingredients as shown in Table 8 are contemplated as a useful embodiment of this invention.

TABLE 8

Polyethylene Terephthalate Compounds for Electronic Circuitry Encapsulation

| Component | Quanitity Broad Range | Preferred Range |
|---|---|---|
| Polyethylene Terephthalate, wt %[a] | 30-95 | 35-65 |
| Glass Fibers, wt %[a] | 4-20 | 10-20 |
| Aliphatic Polyester, pph resin | 0.5-15 | 2.5-10 |
| Ionic Hydrocarbon Copolymer, pph resin | 0.1-3 | 0.2-1.2 |
| Antioxidant, pph resin | 0.01-2 | 0.2-1.0 |
| Flame Retardant[b], pph resin | 10-50 | 25-35 |
| Other Additives[b], wt % | 0-20 | |

[a]Based on total weight of the composition.
[b]Optional.

Runs 19, 20, 21, 22, 23, 24 and 25 in Table 9 show the quantities of components in polyethylene terephthalate molding compositions which contained 5 to 25 weight percent fiber glass optionally with carbon black. The properties of injection molded samples made from these formulations are also shown in Table 9.

All the compositions of Runs 19, 20, 21, 22, 23, 24 and 25 were blended, processed and injection molded as described hereinabove.

The presence of carbon black in the formulations of Runs 23 (15 weight percent fiber glass; 1 weight percent carbon black) and 24 (10 weight percent fiber glass; 1 weight percent carbon black) appeared to have little effect on molded sample properties. These properties were quite similar to the properties of molded samples in Runs 20 (15 weight percent fiber glass; 0 weight percent carbon black) and 19 (10 weight percent fiber glass; 0 weight percent carbon black). Based on these observations, carbon black appears to be an optional ingredient in the polyethylene terephthalate molding compositions.

In Runs 19, 20, 21 and 22 in Table 9 the fiber glass filler loading was increased, respectively, from 10 to 15 to 20 to 25 weight percent. The expected increases in molded sample properties were observed with the exception, of course, of melt flow values, which predictably decreased with increases in fiber glass loadings.

Run 25 in Table 9, shows that molded sample properties were diminished at the low level of 5 weight percent fiber glass; however, such materials can be useful in selected applications.

In general, the runs of Table 9 show that fiber glass filler levels in polyethylene terephthalate molding resin formulations can vary over the range of 5 to 25 weight percent. The presence of carbon black in these systems appears to have no serious detrimental effect on the properties of molded samples.

TABLE 9

Polyethylene Terephthalate Molding Compositions with Varied Levels of Glass Fiber Filler

| | Composition Run Number | | | | | | |
|---|---|---|---|---|---|---|---|
| | 19 | 20 | 21 | 22 | 23 | 24 | 25 |
| INGREDIENTS | | | | | | | |
| Polyethylene Terephthalate[a], wt. % | 62.6 | 76.0 | 73.4 | 68.8 | 77.3 | 81.9 | 86.6 |
| Glass Fiber[b], wt. % | 10.0 | 15.0 | 20.0 | 25.0 | 15.0 | 10.0 | 5.0 |
| Aliphatic Polyester[c], pphr | 7.0 | 7.0 | 7.0 | 7.0 | 7.0 | 7.0 | 7.0 |
| Ionic Hydrocarbon Copolymer[d], pphr | 1.0 | 1.0 | 1.0 | 1.0 | 1.0 | 1.0 | 1.0 |
| Antioxidant[e], pphr | 1.0 | 1.0 | 1.0 | 1.0 | 0.5 | 0.5 | 0.5 |
| Color Concentrate[f], wt. % | | | | | 1.0 | 1.0 | 1.0 |
| PROPERTIES | | | | | | | |
| Flexural Modulus, MSI | 0.7 | 0.8 | 1.0 | 1.1 | 0.88 | 0.71 | 0.25 |
| Flexural Strength, KSI | 18.9 | 24.0 | 27.2 | 30.1 | 23.6 | 17.5 | 14.3 |
| Tensile Break, KSI | 13.8 | 16.5 | 18.3 | 20.0 | 15.7 | 13.3 | 10.5 |
| % Elongation | 5.9 | 6.4 | 6.1 | 6.2 | 5.3 | 5.3 | 5.4 |
| Notched Izod, ft. lb./in. | 0.9 | 1.2 | 1.5 | 1.8 | 0.8 | 0.7 | 0.5 |
| HDT, °C. at 1820 KPa | 202 | 209 | 212 | 218 | 199 | 160 | 98 |
| Melt Flow, 275° C., 5 Kg, g/10 min. | 98 | 70 | 68 | 46 | 114 | 124 | 140 |

[a]Goodyear Traytuf ® 5900 polyethylene terephthalate was used.
[b]CertainTeed 93B glass fibers were used.
[c]Paraplex ® G-25, commercially available from C. P. Hall, was used.
[d]Formion ® 105, commercially available from A. Schulman, Inc., was used.
[e]Irganox ® 1010, a hindered phenol antioxidant commercially available from Ciba-Geigy Corporation was used.
[f]Black color concentrate available from Reed Plastics was used. CPET 01333 is 21% carbon black in polyethylene terephthalate.

EXAMPLE 8

Runs 26, 27, 28, 29 and 30 in Table 10 show the quantities of components in polyethylene terephthalate molding compositions which contained 15 weight percent fiber glass filler optionally with a flame retardant. The properties of injection molded samples made from these compositions are also shown in Table 10.

All the compositions of Runs 26, 27, 28, 29 and 30 were blended, processed and injection molded as described hereinabove.

The results in Table 10, show that the compositions used in Runs 26, 27, 28 and 29 exhibited very desirable spiral flow characteristics, e.g., about 19 inches at 20,250 psi. These data indicate that the subject compositions possessed a high degree of injection moldability, i.e., these compositions would readily flow into all the recesses of an intricate mold. By comparison, the spiral flow of a typical 30 weight percent fiber glass filled polyethylene terephthalate molding composition was in the range of 14 inches at 20,250 psi.

The compositions of Runs 26, 27, 28 and 29 were molded into samples which possessed very good flexural and tensile properties, high heat distortion temperature values and good Izod impact results. The differential scanning calorimetry (DCS) results indicated that these compositions were rapidly crystallizable PET molding formulations.

The composition used in Run 30 of Table 10 exemplifies a flame retarded polyethylene terephthalate molding formulation with a 15 weight percent loading of fiber glass filler. The flexural modulus and notched Izod impact properties of molded samples made from this formulation were essentially the same as the properties of other molded samples in Table 10. Some compromise can be seen in the flexural strength property.

TABLE 10

Polyethylene Terephthalate Molding Formulations with 15 Weight Percent Glass Fiber

| | Composition Run Number | | | | |
|---|---|---|---|---|---|
| | 26 | 27 | 28 | 29 | 30 |
| INGREDIENTS | | | | | |
| Polyethylene Terephthalate[a], wt. % | 78.3 | 79.8 | 78.7 | 80.2 | 60.5 |
| Glass Fiber[b], wt. % | 15.0 | 15.0 | 15.0 | 15.0 | 15.0 |
| Aliphatic Polyester[c], pphr | 7.0 | 5.0 | 7.0 | 5.0 | 7.0 |
| Ionic Hydrocarbon Copolymer[d], pphr | 1.0 | 1.0 | 0.5 | 0.5 | 1.0 |
| Antioxidant[e], pphr | 0.5 | 0.5 | 0.5 | 0.5 | 0.5 |
| Brominated Polystyrene[f] | | | | | 29.0 |
| Sodium Antimonate[g] | | | | | 3.0 |
| PROPERTIES | | | | | |
| Spiral Flow, in a 0.060 × 0.250 inch mold at: | | | | | |
| 20,250 PSI injection pressure | 20.25 | 18.50 | 20.25 | 19.25 | |
| 13,500 PSI injection pressure | 15.50 | 14.50 | 15.75 | 15 | |
| 6,750 PSI injection pressure | 10.50 | 9.75 | 10.50 | 10 | |
| Flexural Modulus, MSI | 0.8 | 0.8 | 0.9 | 0.9 | 0.9 |
| Flexural Strength, KSI | 24.9 | 25.2 | 25.0 | 25.5 | 19.7 |
| Tensile Break, KSI | 17.1 | 17.2 | 17.3 | 16.7 | |
| % Elongation | 6.4 | 6.4 | 6.3 | 6.1 | |
| Notched Izod, ft.lb./in. | 1.1 | 1.0 | 1.2 | 1.1 | 0.9 |
| Unnotched Izod, ft.lb./in. | 6.5 | 5.6 | 5.9 | 5.1 | |
| HDT, °C. at 1820 KPa | 211 | 211 | 215 | 220 | |
| Melt Flow, 275° C., 5 Kg, g/10 min. | 78 | 83 | 86 | 82 | |
| DSC, °C. Tg | 78 | 77 | 76 | 77 | |
| Tcc | 123 | 123 | 124 | 125 | |
| Tm | 252 | 252 | 251 | 251 | |
| Tmc | 206 | 207 | 204 | 204 | |
| Crystallization Window, | 48 | 48 | 46 | 45 | |
| % UL 94, | | | | | |
| ⅛ inch | | | | | V-0 |
| 1/16 inch | | | | | V-2 |

Notes for Table 10
[a]Goodyear Traytuf ® 5900 polyethylene terephthalate was used.
[b]CertainTeed 93B glass fibers were used.
[c]Paraplex ® G-25, commercially available from C. P. Hall, was used.
[d]Formion ® 105, commercially available from A. Schulman, Inc., was used.
[e]Irganox ® 1010, a hindered phenol antioxidant commercially available from Ciba-Geigy Corporation was used.
[f]TM ® 68-PB, commercially available from Ferro Corporation was used.
[g]Thermoguard TM FR, commercially available from Atochem was used.

Encapsulation tests were run on a small circuit board in an end gated mold using standard molding conditions (235 mold, 520° F. melt). Injection rates were varied for part filling. Samples were X-rayed to determine whether circuit board damage had occurred. Injection rates of up to 30 percent or more of the maximum injection rate commonly used for injection of solid parts did not damage the circuit boards when the invention compositions were used. This compares to a 3 percent injection rate which caused damage to circuit boards when a 30 percent glass fiber filled control sample was used.

While this invention has been described in detail for the purpose of illustration, it is not to be construed as limited thereby, but is intended to cover all changes and modifications within the spirit and scope thereof.

That which is claimed is:

1. A composition comprising:
   (a) polyethylene terephthalate having an inherent viscosity of at least 0.25;
   (b) a filler selected from the group of Wollastonite, mica, glass spheres, glass fibers and mixtures thereof;
   (c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;
   (d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium; and
   (e) an antioxidant.

2. A composition as recited in claim 1 wherein said filler is Wollastonite.

3. A composition as recited in claim 2 wherein said polyethylene terephthalate is from about 25 to about 93 weight percent, based on total weight of the composition;
   said Wollastonite is from about 5 weight percent to about 65 weight percent, based on total weight of the composition;
   said aliphatic polyester is from about 0.1 to about 25 parts per hundred parts resin;
   said metal salt of an ionic hydrocarbon copolymer is from about 0.05 to about 7 parts per hundred parts resin; and
   said antioxidant is from about 0.01 to about 5 parts per hundred parts resin.

4. A composition as recited in claim 1 wherein said filler is glass spheres.

5. A composition as recited in claim 4 wherein said polyethylene terephthalate is from about 25 to about 93 weight percent, based on total weight of the composition;
   said glass spheres are from about 5 weight percent to about 65 weight percent, based on total weight of the composition;
   said aliphatic polyester is from about 0.1 to about 25 parts per hundred parts resin;
   said metal salt of an ionic hydrocarbon copolymer is from about 0.05 to about 7 parts per hundred parts resin; and
   said antioxidant is from about 0.01 to about 5 parts per hundred parts resin.

6. A composition as recited in claim 1 wherein said filler is mica.

7. A composition as recited in claim 6 wherein said polyethylene terephthalate is from about 25 to about 93 weight percent, based on total weight of the composition;

said mica is from about 5 weight percent to about 65 weight percent, based on total weight of the composition;

said aliphatic polyester is from about 0.1 to about 25 parts per hundred parts resin;

said metal salt of an ionic hydrocarbon copolymer is from about 0.05 to about 7 parts per hundred parts resin; and said antioxidant is from about 0.01 to about 5 parts per hundred parts resin.

8. A composition as recited in claim 6 wherein said mica is muscovite mica.

9. A composition as recited in claim 6 wherein said mica is suzorite mica.

10. A composition as recited in claim 1 wherein said filler is a mixture of Wollastonite and glass fiber.

11. A composition as recited in claim 1 wherein said filler is a mixture of glass spheres and glass fiber.

12. A composition as recited in claim 1 wherein said filler is a mixture of mica and glass fiber.

13. A composition comprising:
  (a) from about 30 to about 95 weight percent, based on total weight of the composition, of polyethylene terephthalate;
  (b) from about 4 to about 20 weight percent, based on total weight of the composition, of glass fibers;
  (c) from about 0.5 to about 15 parts per hundred parts resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;
  (d) from about 0.1 to about 3 parts per hundred parts resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium; and
  (e) from about 0.01 to about 2 parts per hundred resin of an antioxidant.

14. A composition as recited in claim 13 additionally comprising from about 10 to about 50 pph resin of flame retardant.

15. A composition comprising:
  (a) from about 35 to about 65 weight percent, based on total weight of the composition, of polyethylene terephthalate;
  (b) from about 10 to about 20 weight percent, based on total weight of the composition, of glass fibers;
  (c) from about 0.5 to about 15 parts per hundred parts resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;
  (d) from about 0.1 to about 3 parts per hundred parts resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium; and
  (e) from about 0.01 to about 2 parts per hundred parts resin of an antioxidant.

16. A composition as recited in claim 15 additionally comprising from about 10 to about 50 pph resin of flame retardant.

17. A process for preparing the composition of claim 1 whereby components (a), (b), (c), (d) and (e) are melt blended and extruded.

18. A process for preparing the composition of claim 2 whereby components (a), (b), (c), (d) and (e) are melt blended and extruded.

19. A process for preparing the composition of claim 4 whereby components (a), (b), (c), (d) and (e) are melt blended and extruded.

20. A process for preparing the composition of claim 6 whereby components (a), (b), (c), (d) and (e) are melt blended and extruded.

21. A process for preparing the composition of claim 10 whereby components (a), (b), (c), (d) and (e) are melt blended and extruded.

22. A process for preparing the composition of claim 11 whereby components (a), (b), (c), (d) and (e) are melt blended and extruded.

23. A process for preparing the composition of claim 12 whereby components (a), (b), (c), (d) and (e) are melt blended and extruded.

24. A process for preparing the composition of claim 13 whereby components (a), (b), (c), (d) and (e) are melt blended and extruded.

25. A process for producing encapsulated electronic components by injection molding a composition as recited in claim 13 about said electronic components.

26. An encapsulated electronic component made by the process of claim 25.

* * * * *